No. 698,229. Patented Apr. 22, 1902.
J. T. SCOTT.
PRESS FOR BALING HAY, COTTON, &c.
(Application filed Dec. 21, 1901.)
(No Model.) 2 Sheets—Sheet 1.

Witnesses

Inventor
J. T. Scott
By
Lacey
Attorneys

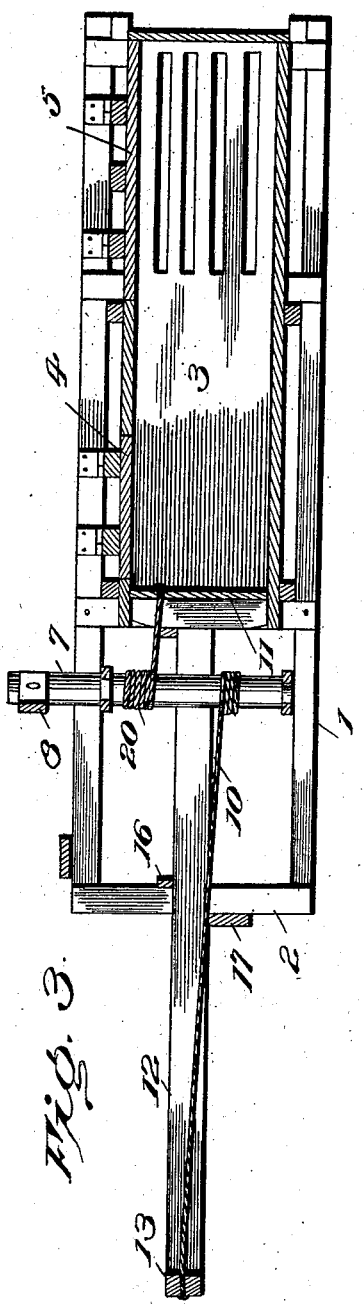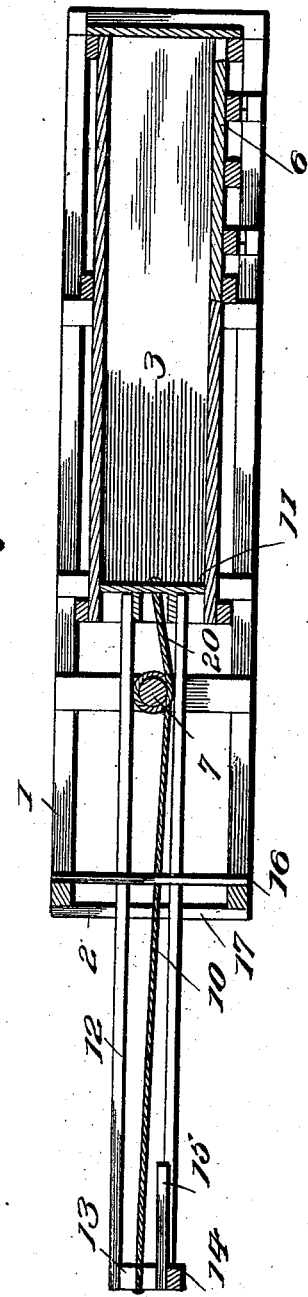

UNITED STATES PATENT OFFICE.

JAMES T. SCOTT, OF BUFFALO, ALABAMA.

PRESS FOR BALING HAY, COTTON, &c.

SPECIFICATION forming part of Letters Patent No. 698,229, dated April 22, 1902.

Application filed December 21, 1901. Serial No. 86,827. (No model.)

*To all whom it may concern:*

Be it known that I, JAMES T. SCOTT, a citizen of the United States, residing at Buffalo, in the county of Chambers and State of Alabama, have invented certain new and useful Improvements in Presses for Baling Hay, Cotton, and the Like; and I do hereby declare the following to be a full, clear, and exact description of the invention, such as will enable others skilled in the art to which it appertains to make and use the same.

This invention relates to the type of presses provided with means for tamping each charge until the box or baling-chamber is filled and with independent mechanism for compressing the charges into a bale of the required size.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
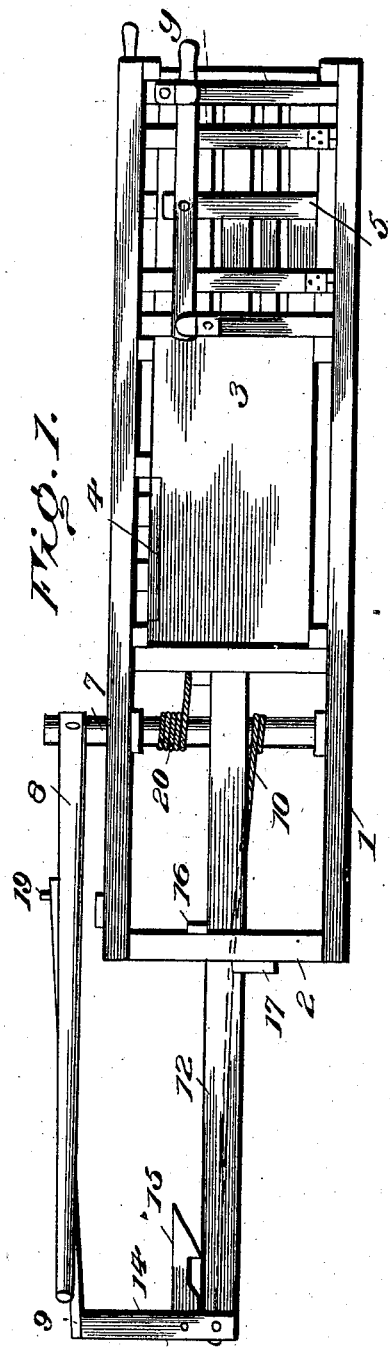
Figure 2:
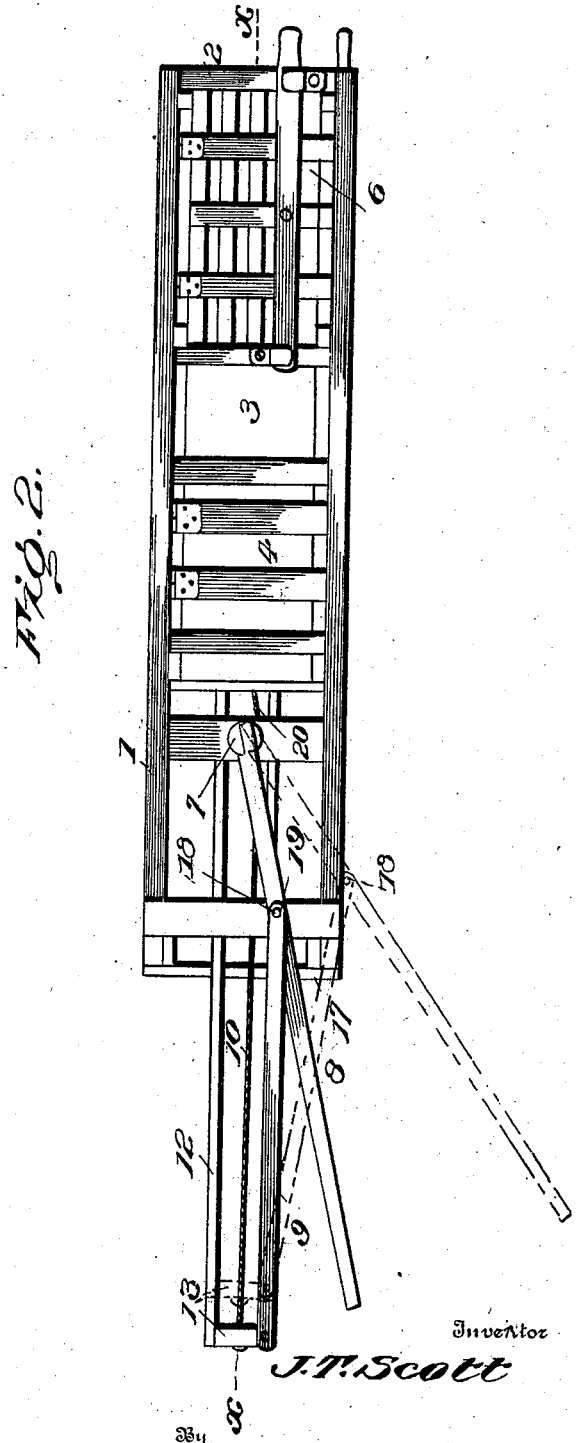

Figure 1 is a side view of a press embodying the invention. Fig. 2 is a top view, the dotted lines showing the operation of the tamping mechanism. Fig. 3 is a vertical longitudinal section on the line X X of Fig. 2. Fig. 4 is a horizontal section on the line Y Y of Fig. 1.

Corresponding and like parts are referred to in the following description and indicated in all the views of the drawings by the same reference characters.

The press may occupy any convenient and desired position, although shown horizontally arranged, this being the preferable disposition. The frame comprises longitudinal beams 1 of about equal length and a series of connecting cross-bars 2, whereby a substantial structure is provided. The baling-chamber 3 is located between the cross-bars 2, and its walls are braced thereby, and access is had thereto for admitting charges by means of the door 4, and the bale is removed by means of the adjacent doors 5 and 6, said doors being held closed by bars or any of the usual securing means common in this class of devices.

The tamping and compressing mechanisms are located at the end of the press opposite to the baling-chamber and comprise a turn-post 7, sweep 8, secured to one end of the turn-post, pitman 9 for connecting the stem of the follower with the sweep, and the cord or rope 10 for connecting the stem of the follower with the turn-post.

The follower 11, mounted for reciprocating movement within the baling-chamber, is provided with a stem composed of spaced parallel bars 12, located one upon each side of the turn-post 7, so as to equalize the work and strain. The outer ends of the spaced parallel bars 12 are connected by the cross-piece 13, and a standard 14 is rigidly attached at its lower end to the outer end of the stem and has the pitman 9 pivotally connected thereto. A catch 15 is pivotally connected to the lower end of the standard 14 and is adapted to engage over a cross-bar 16 when the follower is forced home to the required extent, so as to prevent any rebound of the follower when released from the influence of the compressing mechanism. The cross-bar 16 prevents upward movement of the follower-stem, and downward movement thereof is prevented by means of the cross-bar 17, which is notched or cut away at its upper edge to receive the stem and prevent lateral movement thereof. The pitman 9 has an opening 18 to receive a pin 19, applied to the sweep 8 a distance from the turn-post 7, and when the pin 19 is in engagement with the opening 18 the follower is adapted to be reciprocated by oscillating the sweep, as indicated by the full and dotted lines in Fig. 2.

The cord or rope 10 is connected at one end to the turn-post 7, so as to wind thereon, and its outer end is connected with the cross-piece 13 at the outer end of the follower-stem. Hence upon rotation of the turn-post to wind the cord or rope 10 thereon the follower is advanced into the baling-chamber with great force and compresses the hay or other commodity contained therein. A second cord or rope 20 is connected at one end to the follower, and its opposite end is connected to the turn-post and is adapted to wind thereon in the reverse direction to the cord or rope 10, and by its means the follower is moved to the outer end of the baling-chamber after the formation of a bale. When the turn-post 7 is rotated to wind up the cord or rope 10, the cord or rope 20 is unwound, and upon rotating the turn-post in the reverse direction the cord or rope 20 is wound thereon and the cord or rope 10 unwound, as will be readily comprehended.

In the operation of the press the doors 5 and 6 are secured and the door 4 opened to admit of a charge being supplied to the baling-chamber, after which the door 4 is closed and the sweep 8 oscillated to move the follower within the baling-chamber and again return it to a normal position preliminary to placing a second charge within the baling-chamber. This operation is repeated until the baling-chamber is filled, after which the pitman 9 is disconnected from the sweep 8 and the latter moved to turn the post 7, so as to wind the cord or rope 10 thereon and force the follower within the baling-chamber, so as to compress the hay or other commodity to form a bale of predetermined size. The sweep is moved until the catch 15 engages over the cross-bar 16, when the bale is bound in any of the usual ways and is removed from the baling chamber by means of the doors 5 and 6.

The follower is returned to a normal position by rotating the turn-post in the reverse direction, so as to wind the rope or cord 20 thereon.

Having thus described the invention, what is claimed as new is—

In combination, a baling-chamber, a follower adapted to move therein, a stem composed of spaced parallel bars attached to the follower, a turn-post passed through the space formed between the said parallel bars, ropes or cords attached at one end to the turn-post and adapted to wind reversely thereon and having their opposite ends attached, respectively, to the follower and the outer end of the follower-stem, upper and lower cross-bars having the stem of the follower passed between them, a catch at the outer end of the stem to engage one of the said cross-bars, a sweep applied to the turn-post, and a pitman for connecting the stem with the sweep when tamping the charges and disconnected from the sweep when pressing the bale, substantially as set forth.

In testimony whereof I affix my signature in presence of two witnesses.

JAMES T. SCOTT. [L. S.]

Witnesses:
 E. M. BROOKS,
 JNO. HOLLINGSWORTH.